G. SCHWAGER.
SHOCK ABSORBER FOR VEHICLES.
APPLICATION FILED JUNE 27, 1912.
1,109,255.
Patented Sept. 1, 1914.
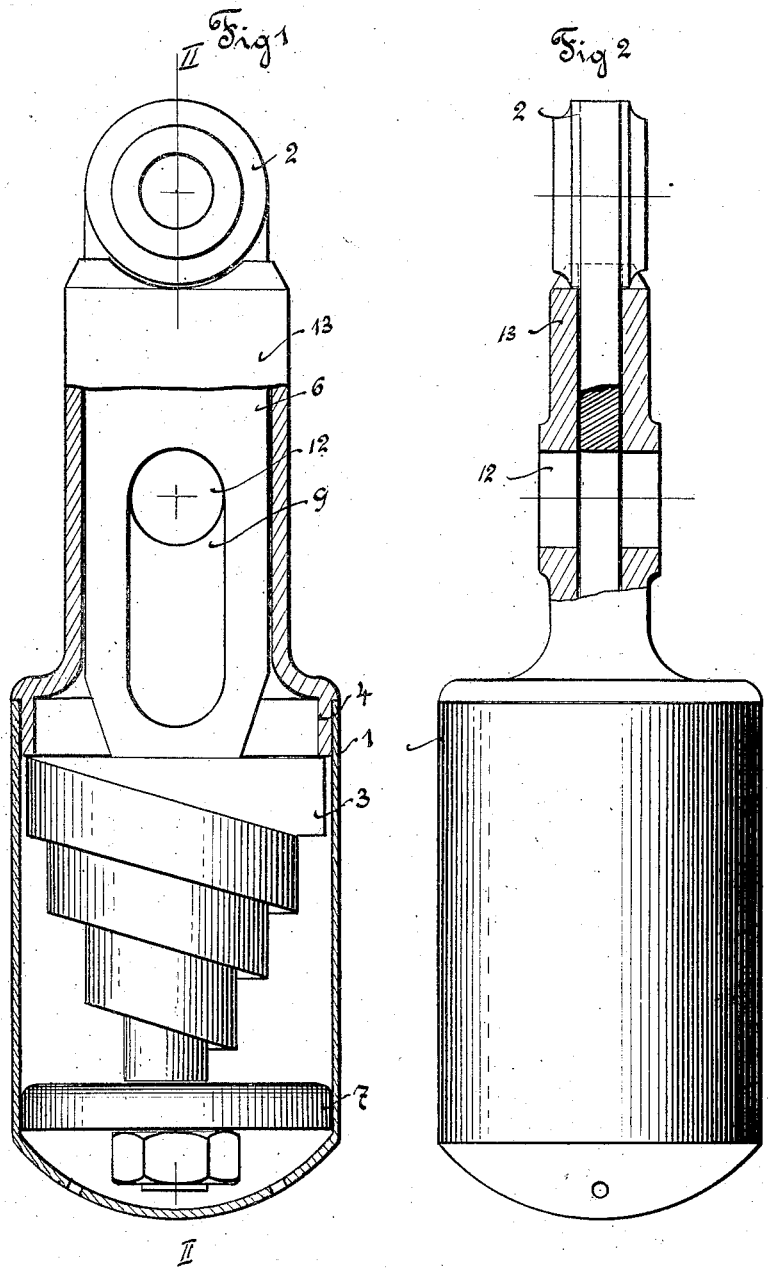

UNITED STATES PATENT OFFICE.

GEORG SCHWAGER, OF BERLIN, GERMANY.

SHOCK-ABSORBER FOR VEHICLES.

1,109,255.

Specification of Letters Patent.  Patented Sept. 1, 1914.

Application filed June 27, 1912. Serial No. 706,225.

*To all whom it may concern:*

Be it known that I, GEORG SCHWAGER, a subject of the German Emperor, and resident of Berlin, Germany, have invented certain new and useful Improvements in Shock-Absorbers for Vehicles, of which the following is a specification.

For receiving and absorbing the shocks which the road-wheels suffer in consequence of the irregularities of the road, and which they transfer to the upper part, the body, of the car, devices are employed, which are attached to the joint between the car-spring and the axle-spring and form a link between these two springs. Such devices are called shock absorbers or shock reducers and consist of a closed sleeve in which moves a piston suspended from a connecting rod and under action of a powerful coiled spring which bears with its other end against the head of the sleeve. The sleeve and the rod are coupled to the car-spring and the axle-spring. When coiled springs of a cylindrical shape are used, the coils of which lie vertically above each other, these springs must be comparatively long and therefore necessitate also long sleeves. This is a very unfavorable feature as on the one hand the devices with such long sleeves have a great weight and this weight hangs very low on the car-springs. By the shocks on the road-wheels these long sleeves begin to oscillate and thereby prevent the axle-spring from coming to rest. In consequence of the length of the sleeve also the rod coupling the car-spring with the axle-spring has to be very long and must therefore be made very strong, so as to be able to bear the strains in consequence of the oscillations of the device. These short, constant vibrations will, a fact well known in engineering, make the rod brittle and lead to a fracture of the same. Even the use of two rods in place of one cannot avoid this danger or prevent the vibrations of the device. The fracture of the rod or the rods entails very great danger as there will be no connection whatever between the car-spring and the axle-spring, or between the car-body and the truck, so that the body may topple over.

The present invention relates to a device for absorbing the shocks, in which the well known drawbacks of the other devices are avoided by providing a comparatively wide coupling bar having a corresponding thickness and guided and protected along its entire length, and by the sleeve being very much shortened, so that its weight is brought up close to the axle-spring and the lever of oscillation is entirely removed or at least very much reduced. For this purpose a buffer spring wound in form of a cone of flat spring steel is arranged in the sleeve, bearing with its narrow end on the piston and with its base against the head of the sleeve; in this spring is arranged the piston-rod of a rectangular section. This piston-rod has an elongated slot through which a connecting bolt is passed. The conical buffer spring stands with its small end centrally on the piston and will therefore also transfer the effect of the shocks centrally on the said piston and prevent the latter from moving to an inclined position.

In the accompanying drawing the device is exemplified in a constructional form, Figure 1 being a longitudinal section and Fig. 2 a section through Fig. 1 on the line II—II.

The shock-absorber consists of the sleeve 1 made of steel or wrought iron, which is closed below and there provided with air-vent holes. At the upper end the sleeve 1 is screwed into the head 13. In this head 13 is guided the coupling bar 6 having a gliding fit therein. At the upper end this bar 6 has a coupling-eye 2, in the middle a slot 9 and at the lower end a threaded stud on which the piston is screwed. On this piston 7 bears the conical spring 3 encircling the connecting bar 6, so that the point of the spring presses centrally on the piston. The spring bears with its other, wide end against the flange 4 of the head 13. In the middle or close to the middle of its longitudinal extension the head 13 has faces, through which a hole 12 is bored. By means of a suitable bolt passing through the hole 12 of the sleeve the same is connected to the vehicle spring in a similar manner as described above with respect to the connection with the axle spring. According to the position of the axle-spring and the car-spring these may also be attached to the device in the opposite order, so that the axle-spring is attached to the bar 6 and the car-spring to the head 13.

In order to take advantage of the above mentioned capacity of my device it is necessary merely to reverse the relative positions of the piston and spring at the same time running the connecting bar or hanger 6 out of the cylinder head so that the inner end of the slot 9 is in alinement with the hole 12. The cup leather is also reversed at the same time.

For the purpose of reducing the length of the device as far as possible, and particularly allowing of making the connecting bar of the absolutely necessary length only, so that as short as possible a piece of it projects beyond the head and remains without a guide, the sides of the head are cut out and the head of the bar 6 can reach down close to the coupling pin in the head 13, so that a tipping or choking of the bar is impossible.

The device operates as follows: In meeting an obstruction on the road the wheel and the axle spring are abruptly and violently raised. The axle spring being connected with the hanger therefore also raises the same and consequently also the piston 7 within the sleeve 1. By this action the spring 3 resting upon said piston is compressed. The vehicle spring to which the sleeve 1 is connected by means of a bolt passing through the hole 12 will not receive the shock as the same is entirely absorbed by the spring 3 which expands again after receiving a shock in the above-described manner. The connection of the axle springs varies according to the form of said spring. In case the axle is C-shaped the point of connection of the vehicle spring is located beneath its connection with the axle spring and the latter is connected to the sleeve head 9 at 12 while the axle spring is connected at 2. In case however the springs have the form of an ellipse the point of connection of the vehicle opening is located above that of the axle spring and the vehicle spring in this case is connected at 2 while the axle spring is connected to the head 9, in both cases a shock will cause a compression of the spring 3 in such a manner that one of said axles will not be effected by said shock.

I claim:

1. In a shock absorber of the character described the combination with a conical volute spring, of a cylinder surrounding said spring and provided with an air vent in its bottom part, of a piston adapted to support the small end of said spring, and of a flat hanger centrally disposed within said cylinder and guided within the head of the same, substantially as described.

2. In a shock absorber of the character described, the combination with a cylinder, of a conical volute spring mounted within said cylinder, a piston also mounted within said cylinder having a flat coupling rod or bar connected thereto and projecting through the head of said cylinder, said spring being arranged so as to surround said bar and bear against said piston at its small end, the head of said cylinder being provided with an extension whose length is comparable to that of the cylinder proper, said extension having a longitudinal aperture therein affording an extended bearing for said flat connecting bar, said extension having transverse apertures for the reception of a bolt, and said bar having a transverse bolt aperture as well as a slot for receiving a bolt passed through the apertures in said extension, and means for attaching said piston to said bar, said cylinder being vented for the relief of air under compression.

In witness whereof I, have hereunto signed my name this 12th day of June 1912, in the presence of two subscribing witnesses.

GEORG SCHWAGER.

Witnesses:
WOLDEMAR HAUPT,
HENRY HASPER.